Dec. 15, 1942. S. O. CHRISTIANSON 2,305,061
EGG MATERIAL TREATING MACHINE
Filed Aug. 25, 1941
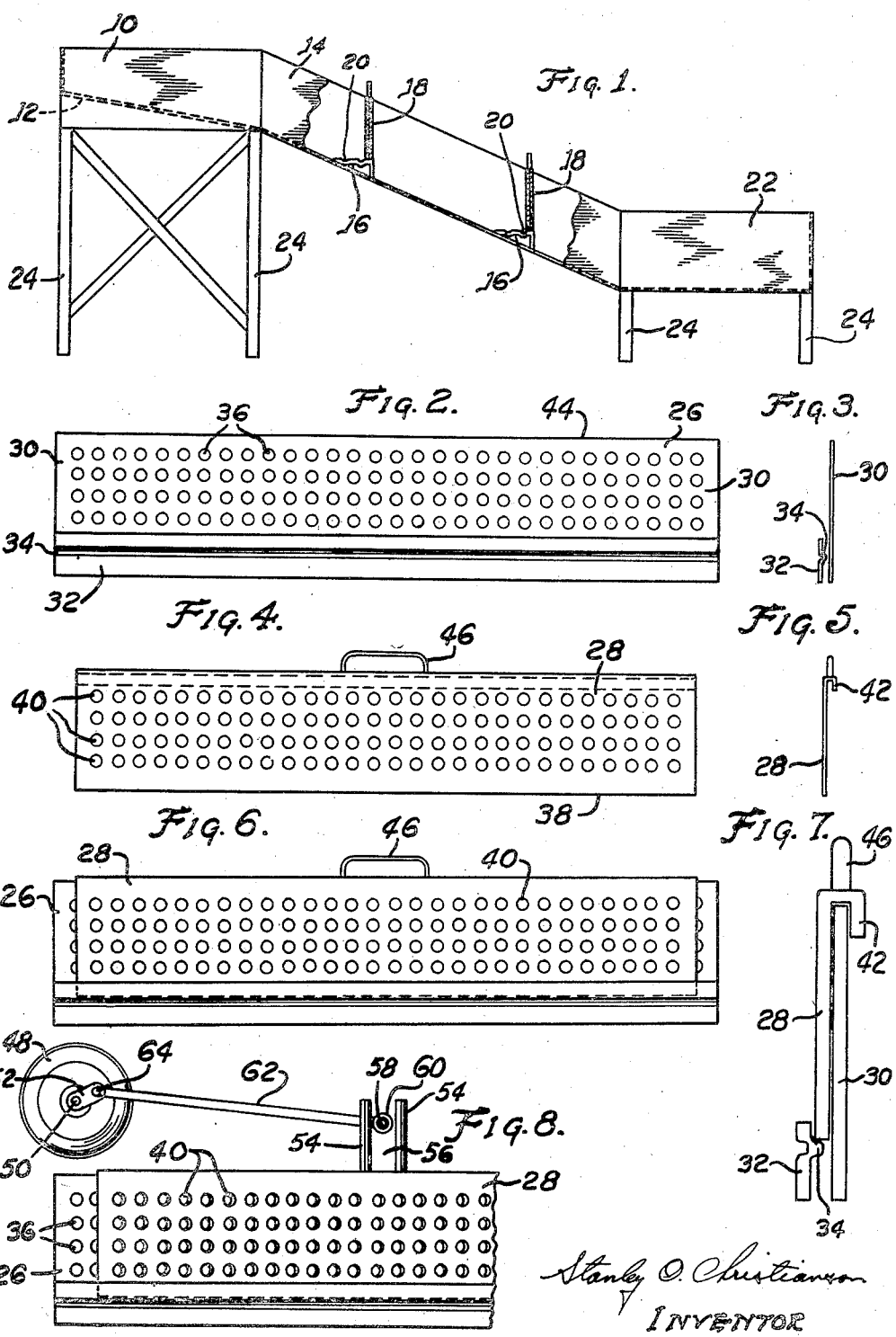
Stanley O. Christianson
INVENTOR Patented Dec. 15, 1942

2,305,061

UNITED STATES PATENT OFFICE 2,305,061

EGG MATERIAL TREATING MACHINE

Stanley O. Christianson, Chicago, Ill.

Application August 25, 1941, Serial No. 408,175

3 Claims. (Cl. 146—2)

This invention relates to a new and improved egg material treating machine and has for one of its principal objects the provision of means for producing an egg material very desirable for baking and capable of producing higher quality bakery products.

An important object of this invention is to provide a device for shearing egg whites, and thereby reducing the jelly like mass and also the stringy chalaza material into desired minute particles.

Another important object of this device is the provision of a gravitational egg white preparing machine that employs a stationary foraminous member and a moving foraminous member operating in conjunction with each other to cut or chop the egg whites to a point where they yield maximum volume upon beating.

A further important object of this machine for treating egg white materials lies in its ability to successfully prepare this material for frozen storage and wherein the frozen egg white upon thawing is properly conditioned for immediate use in the process of baking.

A still further important object of the invention resides in the simple and economical construction of the machine to be used and its particular readiness to hand or motor operation in combination with the savings in resultant egg material "baking" volume.

Other and further important objects will become apparent from the disclosures in the accompanying drawing in which:

Fig. 1 is a side elevation of a cascade type egg material treating machine with parts broken away to show the device of this invention incorporated therein.

Fig. 2 is a front view detail of the stationary foraminous member used in this device.

Fig. 3 is an end view of the member shown in Fig. 2.

Fig. 4 is a front view detail of the reciprocating foraminous member used in this device.

Fig. 5 is an end view of the member shown in Fig. 4.

Fig. 6 is a front view assembly of the device of this invention showing manual means of operation.

Fig. 7 is an end view of the assembly of Fig. 6.

Fig. 8 is an assembly view of the device incorporating a means of motor operation with the foraminous members having their apertures partially misaligned.

As shown in the drawing:

The reference numeral 10 indicates generally a hopper into which is put egg materials to be subjected to treatment before use in baking or for storage. The device of this invention is especially adapted for use in the preparation of egg whites prior to their use. Egg whites are composed of a jelly mass with a small amount of stringy chalaza material. In its natural state the egg white does not beat or whip as effectively for baking purposes because it must first be broken down into a somewhat homogeneous substance capable of permitting air to be incorporated therewith. It is the specific purpose of this device to chop or cut the entire egg white material into small particles.

The eggs are broken and the whites dropped in the hopper 10 having a sloping base 12. The egg white material flows down this sloping base 12 to the inclined trough 14 having a number of steps 16 making the trough 14 a cascade or series of falls, over and down which the egg white material flows by gravity.

Above one or several of these steps 16 is placed a chopping device 18 of this invention. Although the drawing shows only two steps with a chopping device mounted over each one, any number of steps may be employed and likewise the chopper 18 need only be used in one location on the inclined trough. The steps not using the chopper of this invention may employ other types of clarifying devices such as depending fingers (not shown). The steps are equipped with longitudinal grooves as shown at 20 so that undesired substances such as pieces of egg shells, yolk or foreign matter may be removed through the open top cascade 14. The treated or sheared egg white material is then deposited in the receptacle 22 ready for immediate use or storage as desired. The machine is preferably mounted on legs 24 and arranged so that the hopper 10 is on a higher level than the receptacle 22.

The chopper or shearing device 18 is shown in greater detail in the remaining figures of the drawing. The device is composed of two foraminous members namely a stationary member 26 and a movable member 28 shown in Figs. 2 and 4 respectively. The stationary member 26 comprises a plate like element 30 and a guide strip 32 having a rail like rib 34 pressed out from this strip. The plate element 30 is supplied with numerous apertures 36 which are preferably small.

The movable foraminous member 28 is adapted to be positioned closely adjacent the stationary member 26 and have its lower edge 38 ride on the rail or track 34. The upper edge of the movable plate 28, having apertures 40 capable of alignment with the apertures 36 of the stationary foraminous plate 30, is turned over in an inverted U shape as shown at 42 for the express purpose of hanging or riding on the upper edge 44 of the stationary member.

The stationary foraminous member 26 is positioned substantially vertically and rigidly above one of the steps 16 between the side walls of the cascade 14. The movable foraminous member 28 is shorter in length than the member 26 as best shown in Fig. 6 and thus is able to slidably move a short distance in respect to the stationary member 26 until it reaches its limits as defined by the side walls of the cascade 14.

In operation the foraminous members are arranged as shown in Figs. 6 and 7, and mounted in a cascade as shown in Fig. 1 at 18. A handle 46 is provided on the movable member 28 for slidably reciprocating it relative to the stationary member 26. This handle 46 is for manual operation when the quantity of egg white material to be chopped is comparatively small. However, when the quantity of egg material to be cut is large, it may be necessary to provide a motor for obtaining reciprocating motion such as is shown in Fig. 8. This particular form of operation is not necessarily a preferred method, but it demonstrates the adaptation of a motor 48 having a rotating shaft 50 with a crank arm 52 mounted or keyed thereto. In place of the handle 46 is positioned a pair of guide rods 54 forming a vertical slot 56 through which travels the pin 58 and its surrounding roller sleeve 60. The pin 58 is an integral part of the lever arm 62 which is pivotally mounted on the end of the crank arm 52 at 64. As the crank arm revolves, the lever arm 62 similarly moves in a rotary motion, but inasmuch as the end pin 58 and sleeve 60 of the arm 62 are slidable in the vertical slot 56 the only motion that is transmitted to the movable plate 28 is reciprocable in its nature allowing the plates to move with respect to each other on the track 34 and the upper inverted U element 42.

This reciprocating motion of one foraminous or perforated plate in sliding relationship with a stationary perforated plate causes an alignment and then a misalignment of the holes 36 and 40. The egg material advances upon this device by means of gravity, and as portions of the jelly and stringy mass tend to push through the holes 36 and 40 that are aligned as shown in Fig. 6, the subsequent misalignment brings about a shearing off of the protruding egg white. This procedure continues until all the egg white has progressed through the device and is thereby cut into small pieces by the reciprocating action of the plates.

Inquiry might be made regarding the advantage of the foregoing treatment of egg whites, and for that reason I will cite here a few of the beneficial results. The chopped or sheared egg white made in accordance with this invention and used for baking, produces much lighter and fluffier cakes than untreated egg white, and it is therefore possible for bakers to use a smaller number of eggs for the same amount of baking. Also, in making meringue for pies the thickness of the meringue made with egg whites treated as per this invention is practically twice as thick as the untreated egg white.

In storing egg material it is desirable to have a substance which contains only a minimum of air mixed therein, and yet must be in a form that will make a somewhat homogeneous mixture. To date, several methods have been tried, the majority of which employ pressure behind a foraminous or perforated member thus forcing the egg material through the apertures. This method is not very successful as it does not cut or chop up the jelly, stringy mass, but merely squeezes it through the holes and a major portion of the material is actually not reduced to any degree of homogeneity. Another method is to employ suction beneath the foraminous member and so suck through the egg material, or still another method is to use a rotating blade for cleaning a cylindrical foraminous member and which necessitates the chalaza to be removed at intervals, but this last method supplies a product filled with undesirable air. The rotating blade tends to whip the egg white in addition to cleaning the cylinder, and so cause air to be mixed therein. My device does not cause air to become mixed with the egg material, and it does chop it up into minute particles making it possible to use all the egg meat whereas other devices must remove accumulated chalaza.

Numerous modifications of this device can be made and still conform to the spirit of my invention. The main object of the invention is to employ a pair of foraminous members movable with respect to each other. The exact shape of these members, or the type of movement whether it be rotary or reciprocal as shown is of minor importance. The foraminous or perforated members may be round, and the motion may be rotary rather than reciprocal. It is preferable that the egg material be fed to the foraminous members by gravity, but the specific type of cascade machine is not important as the perforated cutting members could be placed at the bottom of a tank or on an angle as it is desired. It is also desired that no limitation be made to the use of egg white in this machine because it will successfully break or cut up yolks and possibly other like materials.

It is preferable that the machine be made of stainless steel or other food resistant metals approved for such use, but it is possible that the perforated members may be made of a plastic or other composition.

I am cognizant of the fact that numerous details of construction may be varied throughout a wide range without departing from the principles described herein, and I therefore desire only to be limited by the scope of the prior art.

I claim as my invention:

1. An apparatus for shearing egg white material comprising a hopper for receiving egg whites, a receptacle, an inclined trough extending between the said hopper and said receptacle, a stationary perforated plate placed substantially vertically in said trough, another perforated plate parallel to and closely adjacent the said stationary perforated plate, means for transversely reciprocating the other said perforated plate, whereby the egg white material descends by gravity from the said hopper and its jelly mass containing chalaza is sheared as it passes through the aligning and non-aligning perforations in the stationary and reciprocating plates.

2. An apparatus for shearing egg white material comprising a hopper for receiving egg whites, a receptacle, an inclined trough extending between the said hopper and said receptacle, a plurality of steps in said inclined trough, a pair of foraminous plates positioned substantially vertically on each step, one of said pair of foraminous plates being stationary and the other being movable transversely reciprocable with respect to the stationary plate, whereby the egg white material proceeds by gravity down the incline without added pressure.

3. An apparatus for treating egg white material comprising a hopper, an inclined trough, a receptacle, a stationary foraminous plate positioned substantially vertically in said trough intermediate the ends thereof, another foraminous plate parallel with the stationary plate and adapted to slide in a horizontal direction and while in contact with said stationary plate, means for imparting reciprocating motion to the said other foraminous plate, whereby the egg white material proceeds down the inclined trough by gravity and without any external pressure the inconsistent jelly material oozes through the foraminous plates and is sheared by the horizontal reciprocating plate acting in cooperation with the stationary foraminous plate whereupon the sheared material continues down the inclined trough to the said receptacle.

STANLEY O. CHRISTIANSON.